US006834116B2

(12) United States Patent
Ertl et al.

(10) Patent No.: US 6,834,116 B2
(45) Date of Patent: Dec. 21, 2004

(54) METHOD AND DEVICE FOR DETERMINING THE POSITION OF AN OBJECT WITHIN A GIVEN AREA

(75) Inventors: Ludwig Ertl, Regensburg (DE); Thorsten Köhler, Deuerling (DE); Dirk Zittlau, Stöckelsberg (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 10/014,419

(22) Filed: Oct. 23, 2001

(65) Prior Publication Data

US 2002/0085739 A1 Jul. 4, 2002

Related U.S. Application Data

(63) Continuation of application No. PCT/EP00/02961, filed on Apr. 3, 2000.

(30) Foreign Application Priority Data

Apr. 23, 1999 (EP) ............................................. 99108091

(51) Int. Cl.[7] .............................................. G06K 9/46
(52) U.S. Cl. ....................... 382/103; 382/107; 382/199; 382/217; 382/291; 348/148; 701/45; 280/735
(58) Field of Search ................................. 382/103, 104, 382/107, 199, 236, 291, 216, 209, 217, 218, 220; 348/143, 148; 280/735; 701/45

(56) References Cited

U.S. PATENT DOCUMENTS

| 5,528,698 | A | * | 6/1996 | Kamei et al. ............... 382/100 |
| 5,835,613 | A | | 11/1998 | Breed et al. |
| 5,974,175 | A | * | 10/1999 | Suzuki ....................... 382/199 |
| 5,983,147 | A | * | 11/1999 | Krumm ....................... 701/45 |
| 5,987,154 | A | * | 11/1999 | Gibbon et al. .............. 382/115 |
| 6,118,887 | A | * | 9/2000 | Cosatto et al. .............. 382/103 |
| 6,128,396 | A | * | 10/2000 | Hasegawa et al. .......... 382/103 |
| 6,141,432 | A | * | 10/2000 | Breed et al. ................ 382/100 |
| 6,160,901 | A | * | 12/2000 | Kage .......................... 382/107 |
| 6,198,998 | B1 | * | 3/2001 | Farmer et al. ................ 701/45 |
| 6,608,910 | B1 | * | 8/2003 | Srinivasa et al. ........... 382/100 |

FOREIGN PATENT DOCUMENTS

| DE | 198 09 210 A1 | 9/1999 |
| GB | 2 311 602 A | 10/1997 |
| WO | WO 98/48372 | 10/1998 |

* cited by examiner

*Primary Examiner*—Jon Chang
(74) *Attorney, Agent, or Firm*—Laurence A. Greenberg; Werner H. Stemer; Ralph E. Locher

(57) ABSTRACT

Within a given area, the position of the head of the front seat passenger in a vehicle is determined by producing a differential image, in which only the contour of the moving object appears, from two frames that are recorded one after the other by a video camera. The contours of the differential images are used to calculate the position.

10 Claims, 4 Drawing Sheets

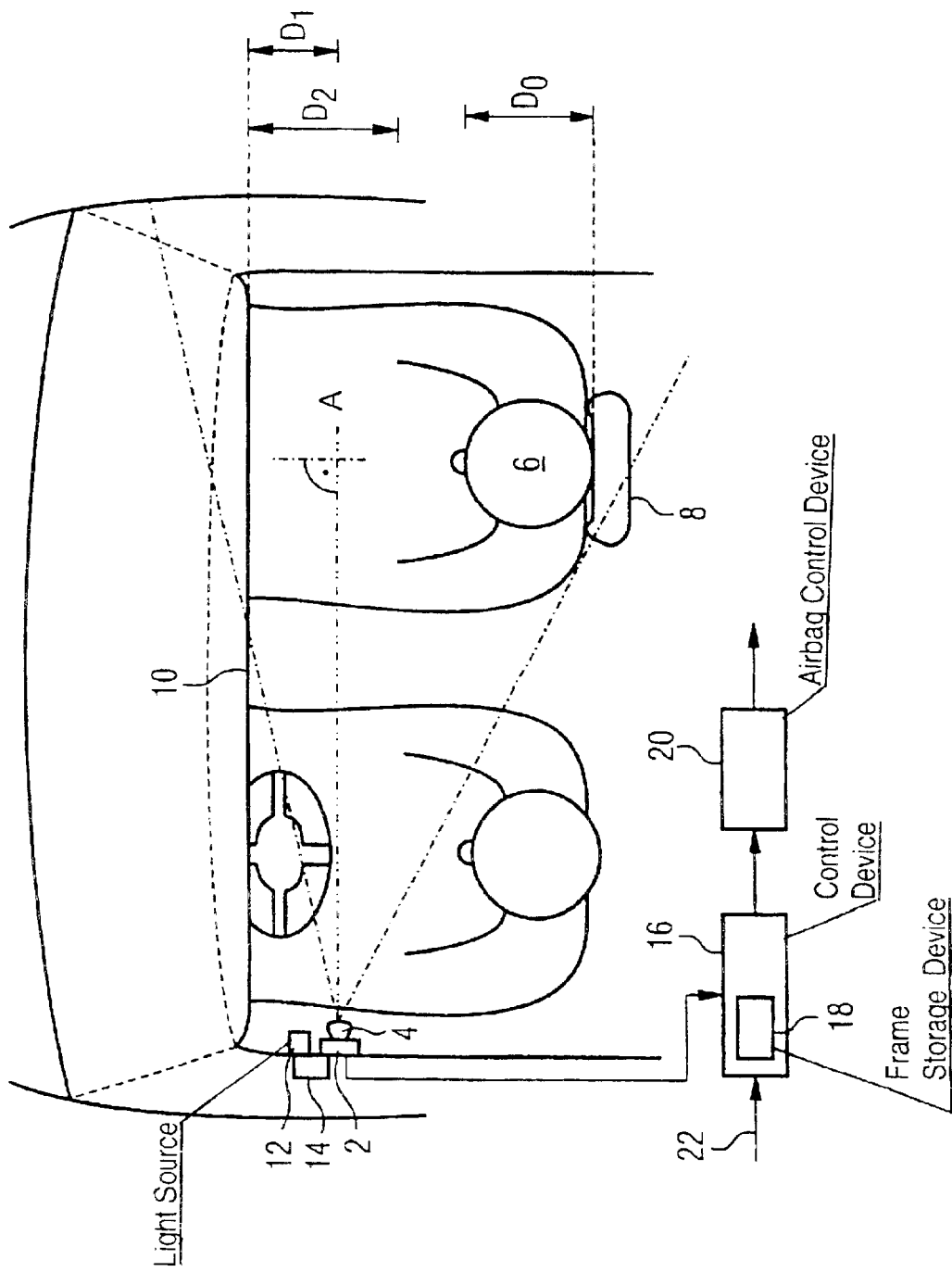

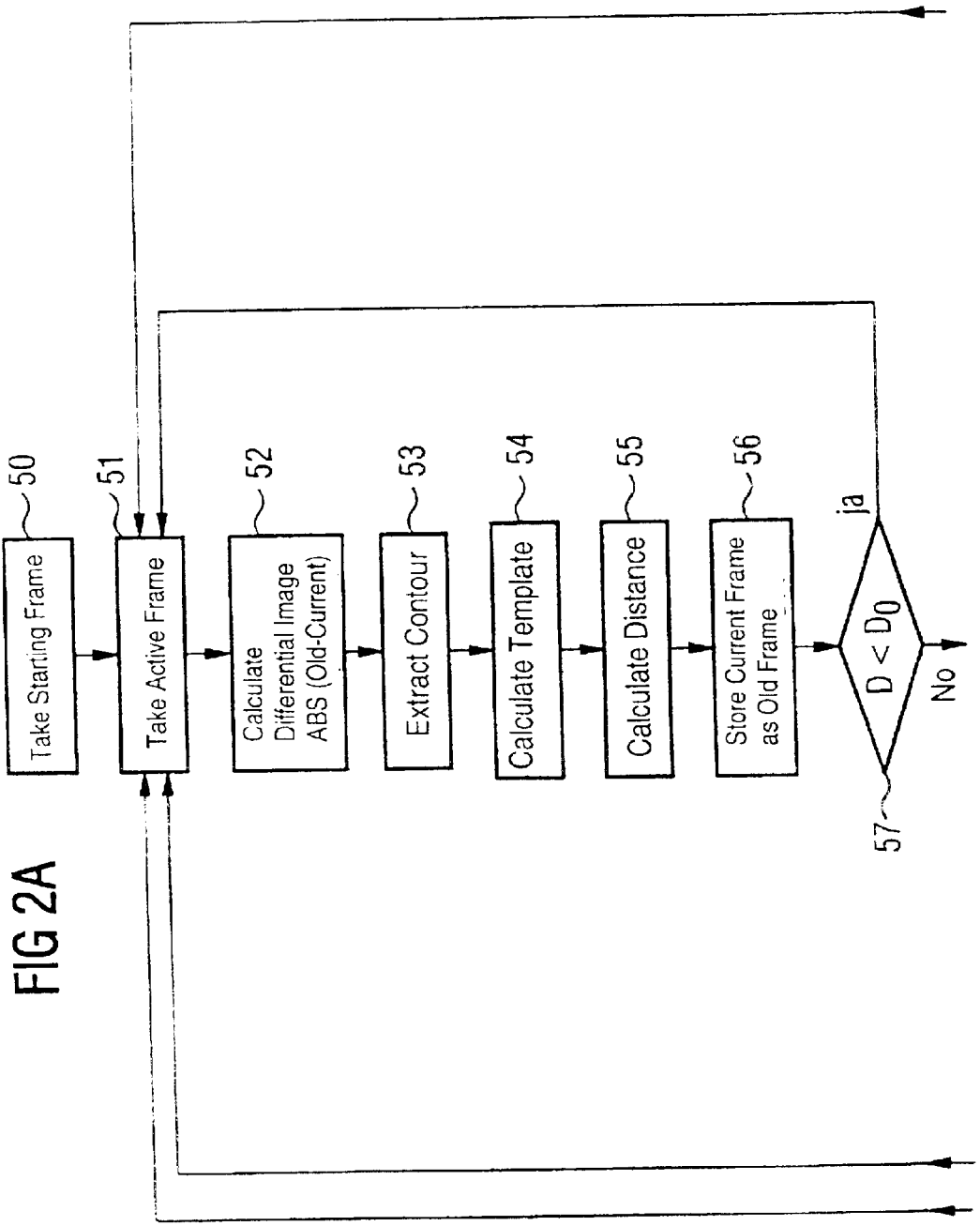

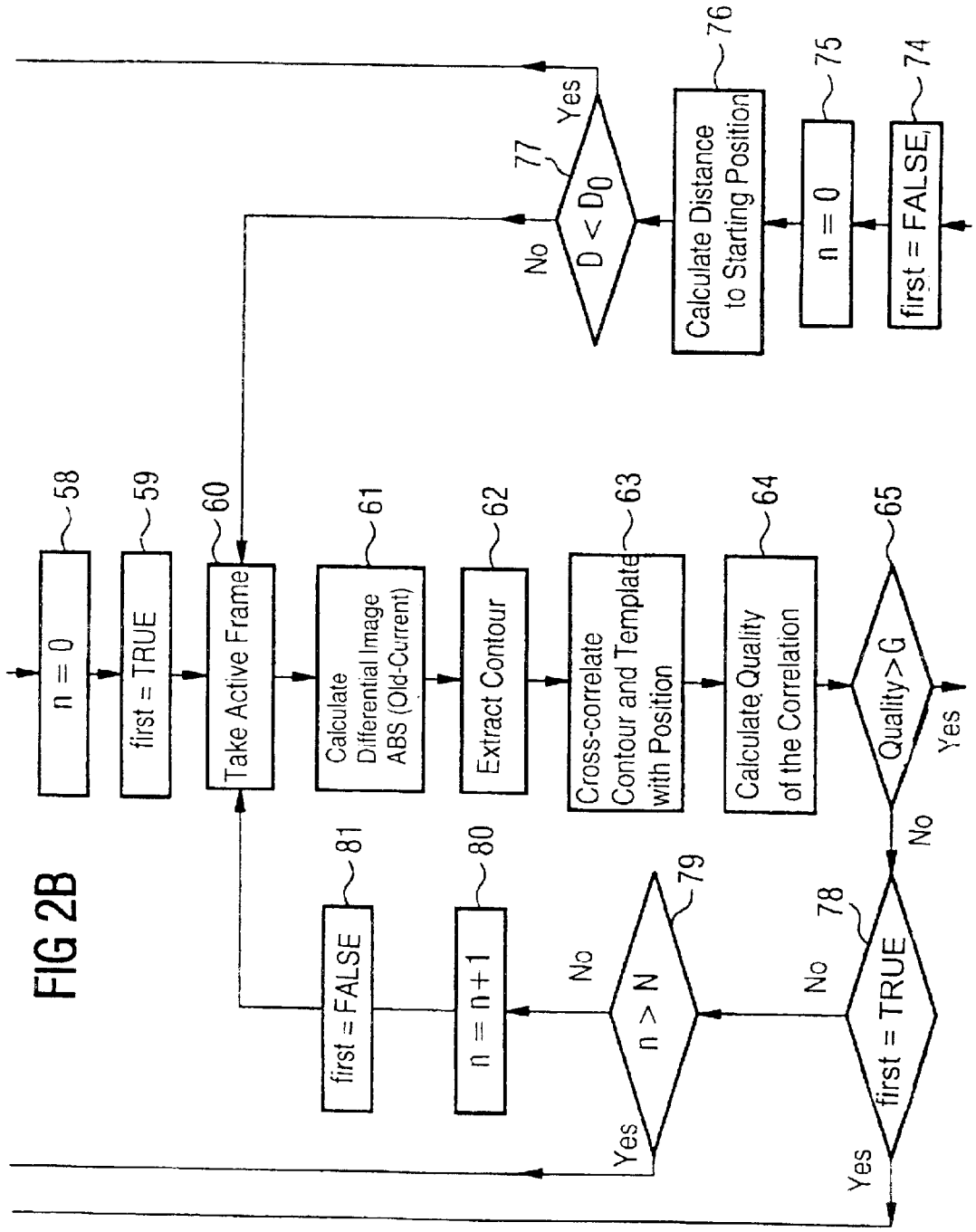

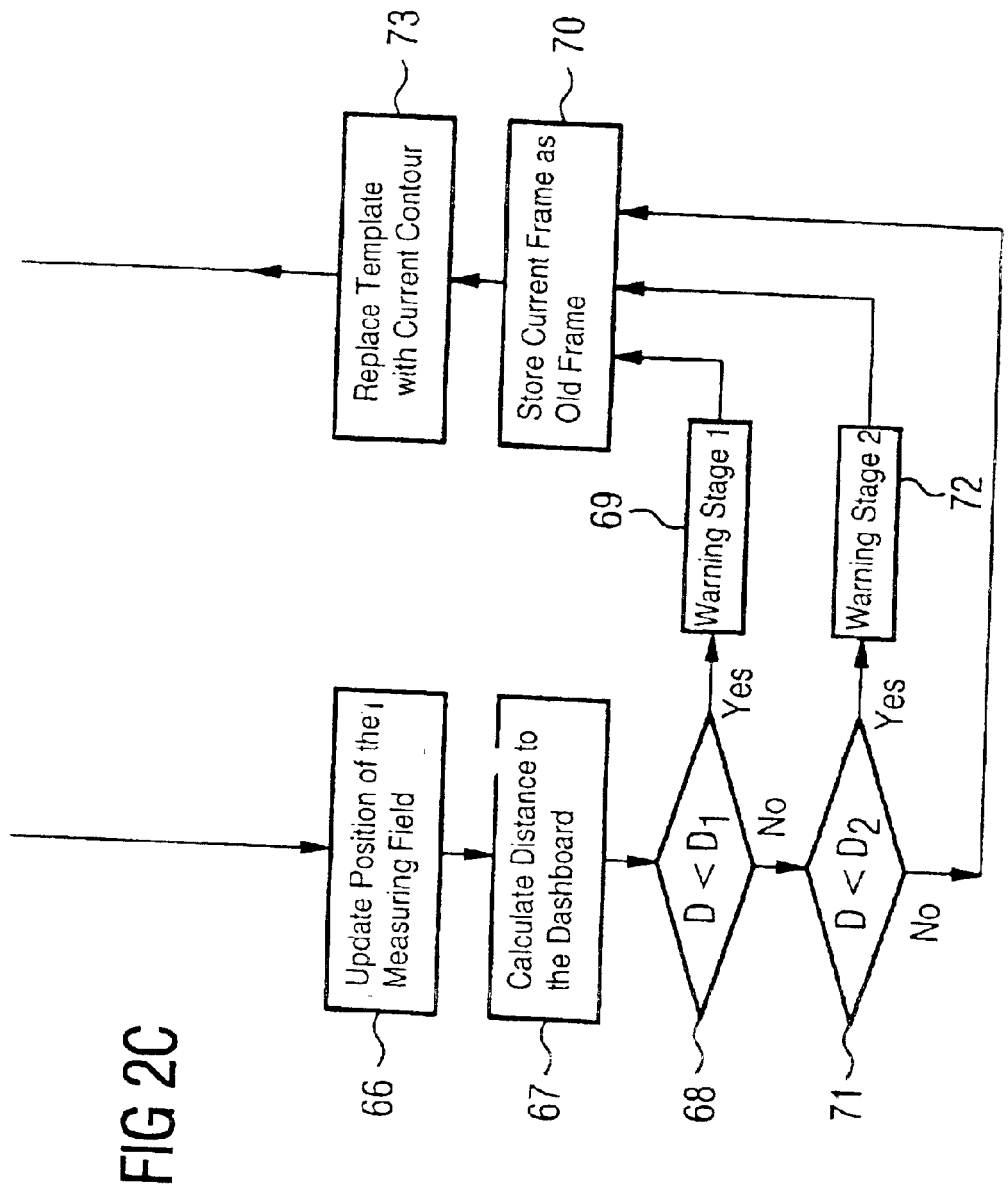

METHOD AND DEVICE FOR DETERMINING THE POSITION OF AN OBJECT WITHIN A GIVEN AREA

CROSS-REFERENCE TO RELATED APPLICATION

This application is a continuation of copending International Application No. PCT/EP00/02961, filed Apr. 3, 2000, which designated the United States.

BACKGROUND OF THE INVENTION

Field of the Invention

The invention relates to a method and to a device for determining the position of an object within a given area, in particular, the position of the head of the front seat passenger in a vehicle.

In the last few years, airbag systems for reducing injuries in the case of accidents in motor vehicles have become widespread and have generally proven their value. As airbags have become increasingly common, individual cases have become known in which the airbag has led to an injury, in particular to a person located on the front passenger seat. The reason for this is usually that the airbag system does not have any reliable information on the position of the front seat passenger. The inflation process of the airbag is configured for extreme situations, i.e. an adult person wearing a seatbelt must not impact against the dashboard in the case of an accident. However, if the head of the front seat passenger is too close to the dashboard (out-of-position) at the time of inflation, this configuration of the airbag system can lead to serious injuries. There are numerous systems in development that are intended to remedy this problem. For example, attempts are being made to use laser triangulation sensors, if appropriate using ultrasound, to measure average distances in the respective vehicle passenger compartment under investigation, and to determine the position of the front seat passenger or of the head of the passenger therefrom. A difficulty here is that the head of the front seat passenger cannot be reliably distinguished from other objects.

Non-pre-published German patent application 198 09 210.5 discloses a method with which the described problem is to be remedied. In this method, the front seat passenger's space is illuminated with a light source and the illuminated given area is recorded with a frame-producing video camera. The illumination is provided with a light beam composed of individual light rays that are bundled closely to one another so that a two-dimensional frame formed of dots is produced. The position of the front seat passenger is determined from the respective recorded two-dimensional dotted frame by determining the distances between the dots of the current dotted frame and the corresponding dots of an originally recorded, stored reference frame. The abovementioned method is relatively costly to execute because the generation of the light beam is costly. Furthermore, in particular, in frames with weak contrasts, it is difficult to make an assignment between a point, for example of the head of the front seat passenger, and the associated frame dots.

SUMMARY OF THE INVENTION

It is accordingly an object of the invention to provide a method and a device for determining the position of a moveable object which overcomes the above-mentioned disadvantages of the prior art apparatus and methods of this general type. In particular, it is an object of the invention to provide a method and a device for determining the position of a front seat passenger, who changes position, in a precise and easily executable manner.

With the foregoing and other objects in view there is provided, in accordance with the invention, a method for determining the position of a moveable object within a given area. The method includes steps of: taking a sequence of frames of a given area with a video camera and calculating a current position of an object in the given area by electronically evaluating the frames of the sequence; comparing a currently taken one of the frames with a previously stored one of the frames to produce a differential image in which a contour of the object appears only when the object moves; and calculating the position of the object based on the differential image.

A differential image is generated in which the contour of the object whose position is to be determined appears only when the object moves. In this way, in a given area, only the moving objects are automatically registered, which considerably simplifies the evaluation of the frames and at the same time makes it more reliable.

In accordance with an added mode of the invention, the object is a head of a front seat passenger in a vehicle.

In accordance with an additional mode of the invention, as long as the object is located within a predetermined region, the method includes: a1) calculating a current differential image; b1) extracting a current contour of the object from the current differential image; c1) after initiation, defining a first contour and using the first contour as a template; for all further contours, incorporating the current contour into the template in a weighted manner; and d1) repetitively performing steps a1 through c1 in order.

In accordance with another mode of the invention, if the object moves out of the predetermined region, the method includes: a2) calculating the current differential image; b2) extracting the current contour from the current differential image; c2) calculating the position of the object using a cross-correlation of the current contour with the template; d2) if a magnitude of the correlation exceeds a predefined amount, centering a measuring window on the current contour, replacing the template with the current contour, and going to step e2); in an absence of a differential image, jumping to step a2); otherwise jumping to step a1); e2) if the contour is again within the predetermined region: jumping to step a1); f2) if the contour moves in a predetermined warning region, issuing an alarm signal; and h2) jumping to step a2).

With the foregoing and other objects in view there is provided, in accordance with the invention, a device for determining the position of a moveable object within a given area, that includes: a video camera with a defined frame sequence time; a control unit with a computer unit; and a frame storage device storing evaluation software; the evaluation software configured to perform the method described above.

In accordance with an added feature of the invention, the frame storage device has a capacity for storing at least five frames.

In accordance with an additional feature of the invention, the video camera is either a CCD camera or a CMOS camera.

In accordance with another feature of the invention, the object is a head of a passenger in a front seat of a vehicle having a dashboard; the video camera has an optical axis and is configured such that the optical axis is aligned approximately perpendicularly with respect to a plane in which movements of the passenger normally take place between the front seat and the dashboard; and the camera has optics that register at least approximately in the region between the passenger and the dashboard.

In accordance with a further feature of the invention, an airbag control device is provided that is activated dependent on a prediction of when the head of the passenger will penetrate into a hazard range. The prediction is based on the trajectory of the head and the speed of the head.

In accordance with a further added feature of the invention, an infrared light source is provided, and the video camera is provided with a filter that cuts out wavelengths below a near infrared spectrum range.

In accordance with yet another feature of the invention, the control device receives an emergency braking signal when an emergency braking occurs.

The device does not necessarily need to operate with an extraneous light source, but can instead use daylight, for example, depending on the purpose of use.

The determination of the position of the object is carried out merely by evaluating successively recorded frames using a suitable evaluation software. There is no need for a complicated light source.

An advantage of the invention lies in particular in the robustness of the evaluation method which supplies reliable results.

Other features which are considered as characteristic for the invention are set forth in the appended claims.

Although the invention is illustrated and described herein as embodied in a method and device for determining the position of an object within a given area, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a plan view of a vehicle passenger compartment with driver and front seat passenger, and shows a block circuit diagram of a device for determining the head position of the front seat passenger; and FIGS. 2A–2C show a flowchart of the method according to the invention.

DESCRIPTION OF THE PREFERRED EMBODIMENTS

Referring now to the figures of the drawing in detail and first, particularly, to FIG. 1 thereof, there is shown a CCD or CMOS video camera 2, which is equipped with a wide-angle lens 4. The video camera 2 is mounted to the left above the driver of a vehicle, for example, in the region of the upper part of the steering pillar of the bodywork. The optical axis A (shown by double dotted lines) of the video camera 2 is oriented in such a way that it perpendicularly intersects a plane in which the head 6 of a front seat passenger normally moves if the front seat passenger makes an overall forward movement or bends forward in the direction of the dashboard 10 out of his rearmost or upright position in which his head 6 bears approximately against a headrest 8. The viewing angle of the video camera 2 and thus its frame region (indicated by dot-dash lines) extends from the headrest 8 as far as the dashboard 10 and thus covers the entire region in which the front seat passenger or his head 6 moves.

Of course, the video camera 2 is mounted in such a way that its field of vision is not shaded either by the driver's sun visor (not illustrated) or by the driver's head. For this purpose, the video camera 2 is mounted as high as possible, if appropriate on the roof lining, offset somewhat inward.

Using software, a measuring field, which lies in front of the headrest 8 of the seat of the front seat passenger as shown in FIG. 1, is predefined on the frame memory of the video camera 2. In a way that will be defined later, a template is produced in this measuring field and the tracing of contours is started.

A CMOS (Complementary Metal oxide Semiconductor) video camera has the advantage over a CCD (Charge Coupled Device) video camera that only the frame information in the measuring box has to be read, enabling the read out time to be reduced to a few milliseconds.

For night driving, an infrared light source 12, which provides illumination during night driving, is provided next to the video camera 2. The lens is advantageously provided with an edge filter in order to promote the near IR (Infrared) range and cut out the visual spectrum range.

The infrared light source 12 is triggered by the video camera 2 by means of the line 14. In order to transmit frames, the memory of the video camera is connected to a control device 16 in which the necessary software is stored and which has a frame store 18 in which at least five frames can be stored. An airbag control device 20 is connected to the output of the control device 16. A further input 22 of the control device 16 is connected to a brake pressure sensor or an ABS control device.

In FIG. 1, $D_0$ indicates a critical distance between the head 6 of the front seat passenger and the headrest 8 when the head moves forward. D1 and D2 are two critical distances between the head 6 and the dashboard 10.

A preferred flowchart of the method steps which are executed in the device according to the invention is illustrated in FIG. 2 and is explained below.

In contrast to the analysis of static given areas or individual frames, the present method is based on analyzing changing given areas, i.e. a series of frames. The reason for this is that, in the case of static given areas, a high rate of incorrect classifications is to be expected. On individual frames it is difficult to associate contours of objects (for example to combine the head with the hair and face in a side view and to distinguish it from the headrest, the seat and the window frame). Even if the information "ellipsoidal headsize shape found near to dashboard" has been extracted from an individual frame, for example, the risk of an incorrect classification is still high. It could still be a football on the front seat passenger's lap.

The method explained by way of example with reference to FIG. 2 constitutes a completely different procedure. The basis of the analysis is always differential images DB of directly successive individual frames E.

The following applies:

$$DB(i, j,)=ABS(E_{(n-1)}(i, j)-E_{(n)}(i, j));$$

where i,j are the two-dimensional coordinates of frame dots whose intensity is E.

Only if an object moves, is its contour distinguished in the differential image and then it can be easily segmented. The method is based on the fact that the head 6 of the front seat passenger is in a normal position, i.e. near to the headrest 8, for most of the time. If the head 6 moves in the direction of the dashboard 10, the contour of the head is traced and the distance from the dashboard is calculated. Here, in order to save time or reduce effort, only one measuring window of approximately twice the size of the head is examined with centering on the head. If the head of the front seat passenger moves into a hazard region, there is a changeover to a more precise tracing of the contour.

The steps shown in FIG. 2 provide details on a preferred exemplary embodiment. In step 50, a starting frame is read in; and in step 51, the current frame recorded by the video camera is read in. In step 52, the frame dots of the differential image are calculated in accordance with the formula given above. In step 53, the contour is extracted or derived from the differential image. In step 54, a template is calculated.

The template is understood to be a frame or a template that is produced by placing contours on top of one another and averaging them. A comparison between a current contour and the template must give a good degree of correspondence otherwise the contour is not taken into account. If, for example, the current contour is a hand, and the template is the head, the hand is not averaged into the template. In this way the template improves continuously.

After the start of the program, the first contour is taken as the first template in step 54. The first distance (step 55) is then of course zero. In the further cycles, the displacement of the current contour (step 53) relative to the template is determined in step 54 in order to average and to calculate and update the template (step 54) and in order to take the displacement in step 55 as an updated distance.

During the determination of the template, the following procedure is advantageously adopted: the first contour is taken as a starting template. During the averaging of the next contour to form the following template, the start template and contour have equal weighting (0.5:0.5). After the, for example, the 1000th step, the respective template would in this way have a weighting of 1000 to a weighting 1 for the contour. In order to prevent new current contours from becoming meaningless as time progresses, the new contours can be given a fixed weighting with which they are input into the determination of the new template.

In step 56, the current frame is stored as an old frame. In step 57, it is determined whether the distance is less than a predetermined critical distance $D_0$ (FIG. 1) from the headrest. If this is the case, the next cycle begins at 51, the differential image being determined in step 52 from the frame stored in step 56 and the current frame.

If it is decided in the decision step 57 that the distance is greater than a critical distance $D_0$, which means that the head 6 has moved a predetermined distance away from the headrest 8, a counter is set to n=0 in step 58. Furthermore, in step 59, a variable "first" is set to TRUE. In step 60, the current frame is read in and in step 61 the differential image is calculated from the current frame and the frame stored in step 56. The contour is then extracted in step 62.

In contrast to the cycle of the steps 51 to 57, a cross correlation between the contour and the template is then carried out in order to determine positioning, because of the more precise tracing of the contour of the head in step 63. Here, the contour is displaced with respect to the template and the product sum of the gray values over all the pixels is formed. The contour and template fit one another in an optimum way if this value has assumed its absolute maximum. The new position is determined from the necessary displacement. The formulas which are used here are known per se and are therefore not explained.

In step 64, the quality of the correlation is calculated or determined.

If the quality is greater than a predetermined value G, which is determined in step 65, the position of the measuring field is updated or adjusted in step 66. In step 67, the distance from the dashboard 10, which the system knows from the frame evaluation or as a result of the external input, is calculated. If this distance is less than a first critical value D1, which is determined in step 68, this leads in step 69 to the generation of a warning stage 1 which is signaled to the airbag control device 20 (FIG. 1). The system then goes to step 70.

If, in step 68, the distance is not below the critical value D1, it is determined in step 71 whether the distance lies below a critical value D2. If this is the case, in step 72 a warning stage 2 is triggered and signaled to the airbag control device. After this, the system proceeds to step 70. If the distance is not less than D2, the system goes on to step 70 without triggering a warning stage.

In step 70, the current frame is stored as an old frame, after which the template is replaced by the current contour in step 73. In step 74, the variable "first" is assigned the value INCORRECT. Then, in step 75, the counter is set to zero again. In step 76, the distance from the starting position or initial position is then calculated. If this distance is less than $D_0$, which is determined in step 77, the system jumps to step 51. If this is not the case, the system jumps to step 60.

Given an inadequate quality of the correlation (step 65), the system goes to step 78 and checks whether the variable "first" has the value TRUE. If this is the case, the system jumps to step 51. If this is not the case, it is checked in step 79 whether the counter reading is above a predetermined reading N. If this is the case, the system jumps to step 51. If this is not the case, the counter reading is increased by one in step 80. In step 81, the variable is assigned the value INCORRECT and the system carries on with step 60.

The checking of the correlation in step 65 achieves the following:

If the quality of the correlation exceeds a predefined degree, it is possible to assume that the head, and not for instance an arm or a hand, is moving through the frame. In this case, the measuring field is centered on the current contour and the template is replaced by the current contour. Otherwise, in the first pass (n=0), the system jumps immediately to the start (step 51). If the contour has already been successfully traced in this loop, and if a signal is absent in the measuring window, the head is at rest. Then, given a predefined number (N) of cycles, the system jumps to step 60, which corresponds to waiting in the current position. N thus means the maximum number of passes during which a head contour must not be measured successively in the measuring field for the measuring field to be reset to the initial position. The system therefore waits some time for a head movement. Only if this does not occur does it jump back into the initial position.

The advantage of the method according to the invention is its robustness. A plausible initial assumption is used at the start. The head is the highest part of the body in the measuring window near to the headrest. If a contour moves out of this region in the direction of the dashboard, and this contour corresponds to the template in the initial phase, the information is passed on to the airbag control unit. Thus, the possibility of, for example, a football on the lap of the front seat passenger being mistaken for the head is virtually excluded. One individual incorrect measurement on its own cannot, in contrast to statistical analysis, lead to the airbag being switched off or to the triggering of the airbag being changed. If the chain of analyses breaks at a point, for example, as a result of the fact that the contour to be traced is lost from the algorithm or a different error occurs, a default triggering of the airbag can be selected during which the airbag is triggered in the case of the accident with a behavior which is defined by the manufacturer of the vehicle or of the airbag. This ensures that the performance of the existing systems without monitoring of the passenger compartment is not impaired.

The frame storage device in the control device 16 requires, with the method described, a capacity of at least five frames, namely the current frame, the current contour, the preceding frame, the differential image and the template.

The control device 16 advantageously receives, as indicated in FIG. 1 by the input 22, an item of information relating to an emergency braking operation. As a result, the condition which leads to the airbag being switched off can be made more stringent in that the information relating to an emergency braking operation is additionally requested. In the case of emergency braking, the head will certainly move. This is in contrast with the case in which the front seat passenger bends forward (out-of-position) with his head toward the airbag in order, for example, to tie his shoes or to look for an object. If the improbable case of the algorithm of the system incorrectly tracing the contour, for example, of a hand, should occur, the airbag would be incorrectly switched off. Switching off of the airbag is always associated with the risk that the airbag is unjustifiably switched off due to a fault and the front seat passenger then suffers injury which it would have been possible to avoid by triggering the airbag. The information relating to an emergency braking operation thus increases the degree of protection against incorrect switching off.

Of course, the differential image method can also operate with evaluation algorithms other than those described. Likewise, the video camera can be accommodated at locations in the vehicle other than those described, for example, near to the interior mirror on the vehicle roof. In this case, the optical axis should also be, as far as possible, perpendicular to the direction of movement of the head of the front seat passenger.

The method or device according to the invention can be supplemented further to the effect that a prediction as to when and whether the head of the front seat passenger will penetrate the hazard region is calculated from the sensed trajectory of his head and its calculated speed. It is thus possible to transmit a corresponding message to the airbag control device a few milliseconds before the hazard region is reached.

We claim:

1. A method for determining the position of a moveable object within a given area, which comprises:
    taking a sequence of frames of a given area with a video camera and calculating a current position of an object in the given area by electronically evaluating the frames of the sequence;
    comparing a currently taken one of the frames with a previously stored one of the frames to produce a differential image in which a contour of the object appears only when the object moves; and
    calculating the position of the object based on the differential image; and
    when the object is located within a predetermined region;
    a1) calculating a current differential image;
    b1) extracting a current contour of the object form the current differential image;
    c1) after initiation, defining a first contour and using the first contour as a template, and for all further contours, incorporating the current contour into the template in a weighted manner; and
    d1) repetitively performing steps a1 through c1 in order.

2. The method according to claim 1, wherein the object is a head of a front seat passenger in a vehicle.

3. The method according to claim 1, which comprises, if the object moves out of the predetermined region:
    a2) calculating a current differential image;
    b2) extracting a current contour from the current differential image;
    c2) calculating the position of the object using a cross-correlation of the current contour with the template;
    d2) if a magnitude of the correlation exceeds a predefined amount, centering a measuring window on the current contour, replacing the template with the current contour, and going to step e2); in an absence of a differential image, jumping to step a2); otherwise jumping to step a1);
    e2) if the contour is again within the predetermined region: jumping to step a1);
    f2) if the contour moves in a predetermined warning region, issuing an alarm signal; and
    h2) jumping to step a2).

4. A device for determined the position of a moveable object within a given area, comprising:
    a video camera with a defined frame sequence time;
    a control unit with a computer unit;
    a frame storage device; and
    evaluation software configured to perform the method according to claim 1.

5. The device according to claim 4, wherein said frame storage device has a capacity for storing at least five frames.

6. The device according to claim 4, wherein said video camera is a camera selected from the group consisting of a CCD camera and a CMOS camera.

7. The device for determining the position of a moveable object according to claim 4, wherein:
    the object is a head of a passenger in a front seat of a vehicle having a dashboard;
    said video camera has an optical axis and is configured such that the optical axis is aligned approximately perpendicularly with respect to a plane in which movements of the passenger normally take place between the front seat and the dashboard; and
    said camera captures images a region between the passenger and the dashboard.

8. The device according to claim 7, comprising:
    an airbag control device activated dependent on a prediction of when the head of the passenger will penetrate into a hazard range;
    said prediction based on a trajectory of the head and a speed of the head.

9. The device according to claim 4, comprising an infrared light source, said video camera provided with a filter that cuts out wavelengths below a near infrared spectrum range.

10. The device according to claim 4, wherein said control device receives an emergency braking signal when an emergency braking occurs.

* * * * *